United States Patent [19]

Philpot

[11] Patent Number: 5,302,895
[45] Date of Patent: Apr. 12, 1994

[54] JOINT OR DISCONTINUITY DETECTOR FOR USE WITH PIPES AND THE LIKE

[75] Inventor: Frank V. Philpot, Rowlands Castle, United Kingdom

[73] Assignee: British Gas PLC, London, United Kingdom

[21] Appl. No.: 573,311
[22] PCT Filed: Mar. 21, 1989
[86] PCT No.: PCT/GB89/00297
  § 371 Date: Oct. 5, 1990
  § 102(e) Date: Oct. 5, 1990
[87] PCT Pub. No.: WO89/09417
  PCT Pub. Date: Oct. 5, 1989

[30] Foreign Application Priority Data

Mar. 26, 1988 [GB] United Kingdom ............... 8807301

[51] Int. Cl.$^5$ ............ G01N 27/72; G01N 27/82; G01R 33/00
[52] U.S. Cl. .................. 324/220; 324/226; 324/262
[58] Field of Search ............... 324/219–221, 324/226, 239–243, 262

[56] References Cited

U.S. PATENT DOCUMENTS

| 3,361,960 | 1/1968 | Renken, Jr. et al. | 324/241 |
| 3,434,046 | 3/1969 | Wilson et al. | 324/221 |
| 4,178,875 | 12/1979 | Moschetti | 324/220 |
| 4,814,702 | 5/1989 | Driggers et al. | 324/220 |

Primary Examiner—Walter E. Snow

[57] ABSTRACT

A detector for detecting joints (5) in a cast iron gas main for instance comprises a sonde (1) having a central transmitting coil (2) and the two receiving coils (3, 4) spaced one on either side of the transmitting coil. At a joint, the gap (6) between the sections of pipe causes differential magnetic coupling between the pipe and the two receiving coils (3, 4). After a pulse of drive current from a control unit is applied to the transmitting coil, comparison by subtraction of voltages induced in the receiving coils and measurement of an appreciable voltage indicates that the sonde (1) is at a joint. In a second embodiment, the sonde (101) is provided with a sealing compound supply pipe (115) and nozzles (120) from which sealing compound can be sprayed into the joint on detection thereof.

26 Claims, 4 Drawing Sheets

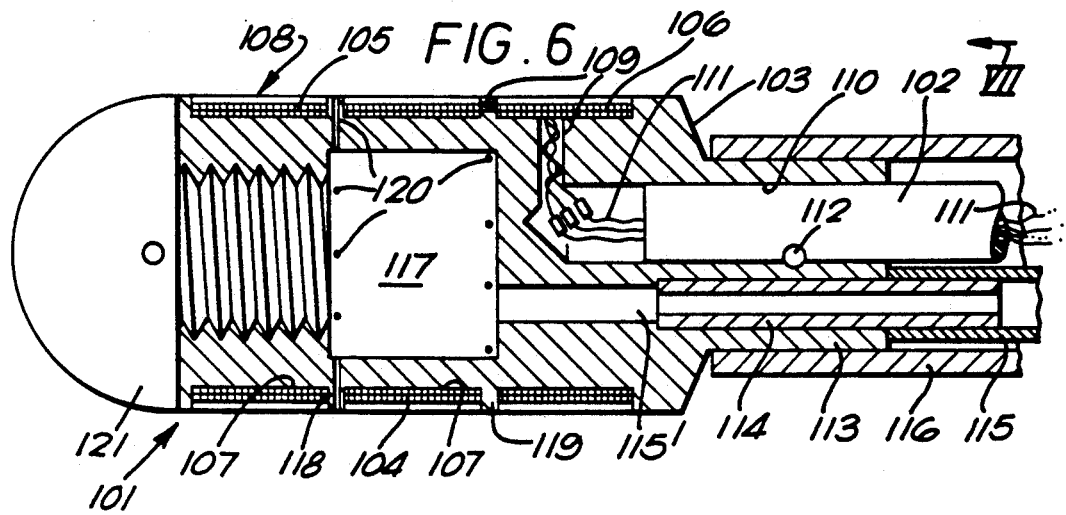
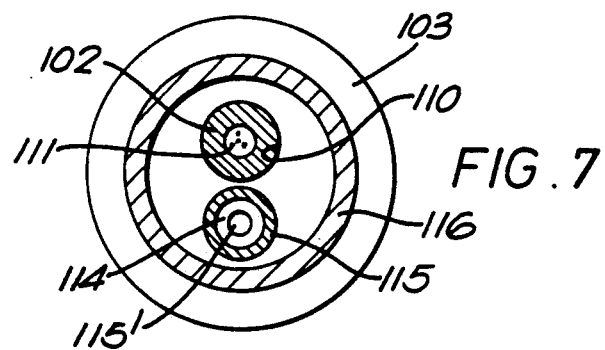
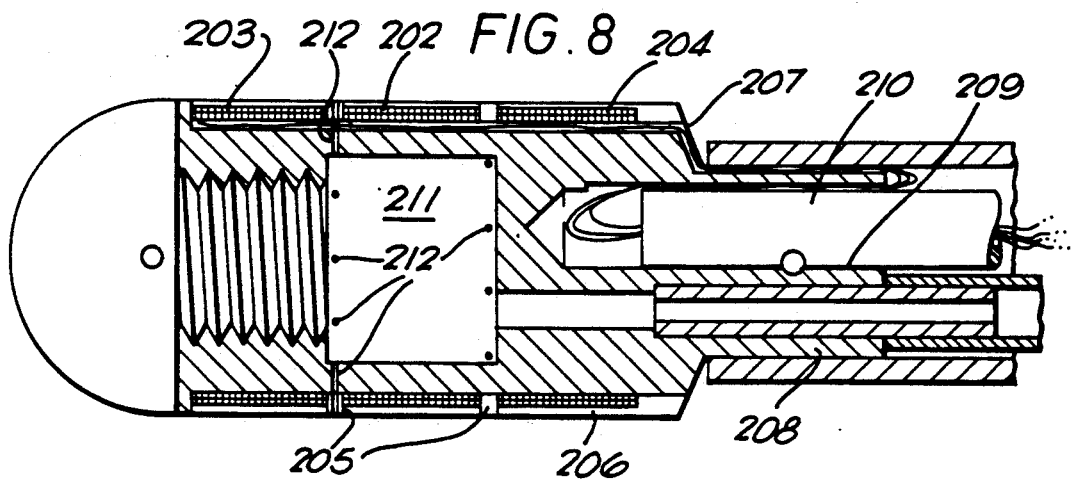

JOINT OR DISCONTINUITY DETECTOR FOR USE WITH PIPES AND THE LIKE

BACKGROUND OF THE INVENTION

The present invention relates to a detector for detecting discontinuities in a medium to be researched, particularly though not exclusively, for detecting discontinuities inside metal pipes as at joints.

It is desirable to be able to detect joints in gas mains since these can leak. This has become a particular problem since the replacement of manufactured gas by natural gas. The latter is much drier than the former, which can and does lead to joint packings drying out, shrinking and then leaking.

A present proposal for detecting joints in cast iron gas mains is to insert through the main a radio transmitter and to follow the transmitter above ground with a receiver. Reception of a signal indicates a joint.

THE INVENTION

The object of the invention is to provide an improved detector, particularly for detecting joints in gas mains, which alone gives indication of a joint.

According to the invention there is provided a detector for detecting discontinuities in a medium to be researched, the detector comprising:
means for generating an electrical drive current;
a sonde having:
- a transmitting coil to be subjected to the drive current, and
- a pair of receiving coils spacedly arranged on respective opposite sides of the transmitting coil, whereby magnetic field is set up in the medium with the sonde adjacent it on subjection of the transmitting coil to the said electrical current and the receiving coils have induced in them different voltages if the magnetic coupling from the medium to one of the receiving coils differs from the magnetic coupling from the medium to the other receiving coil due to a discontinuity in the medium; and means for comparing the voltages induced in the respective receiving coils.

It is envisaged that the coils may be arranged parallel with each other, their axes being spaced along the sonde. However in the preferred embodiments, the coils are arranged parallel with each other, their axes being substantially co-axial.

Whilst it is possible for the drive current to be a sinusoidal current, detection is facilitated if the drive current is a series of switched pulses and the receiving coil voltages are compared subsequent to each pulse.

Although it is envisaged that the current generating means may together with the comparison means may be provided in a single unit with the coils, in the preferred embodiment the former means are provided remotely from the latter coils in the sonde but connected thereto by a cable. Where the coils are to be used inside a pipeline such as a gas main, the cable is preferably arranged within a flexible rod.

In a particularly advantageous embodiment, for use in sealing gas mains whose joints have been detected as discontinuities, the sonde is provided with sealing compound jetting nozzles, and a connection for a sealing compound supply pipe. Conveniently the sonde has an end spigot at which the flexible rod and the supply pipe are permanently attached and onto which is attached a protection tube, in which the flexible rod and the supply pipe extend.

The flexible rod, supply pipe and protection tube may be accommodated when not in use on a coiling device. The cable may terminate at the hub of the coiling device at slip rings. However it is preferred that it continue as a flexible coil able to tolerate a limited number of twists corresponding to uncoiling of the full length of the flexible rod.

To facilitate pushing along a pipeline, the sonde is a circular cylindrical sonde with rounded ends and having a length appreciably greater—at least twice—than its diameter. This configuration allows the sonde to be pushed along the pipeline whilst resting at the bottom of its curvature and aligned with the length of the pipe.

When the magnetic coupling from the pipeline to both receiving coils is identical, the latter will if identical as preferred provide the same response. Accordingly the comparison means may comprise a voltmeter with the receiving coils wired in series opposition. An audio alarm is preferably arranged to sound at a level of response above a threshold value.

To help understanding of the invention a specific embodiment thereof will now be described with reference to the accompanying drawings.

THE DRAWINGS

FIG. 6 is a cross-sectional side view of a sonde of a second embodiment of the invention;

FIG. 7 is a view in the direction of arrow VII in FIG. 6;

FIG. 8 is a cross-sectional side view of a sonde of a third embodiment; and

FIRST EMBODIMENT

Figure 1:
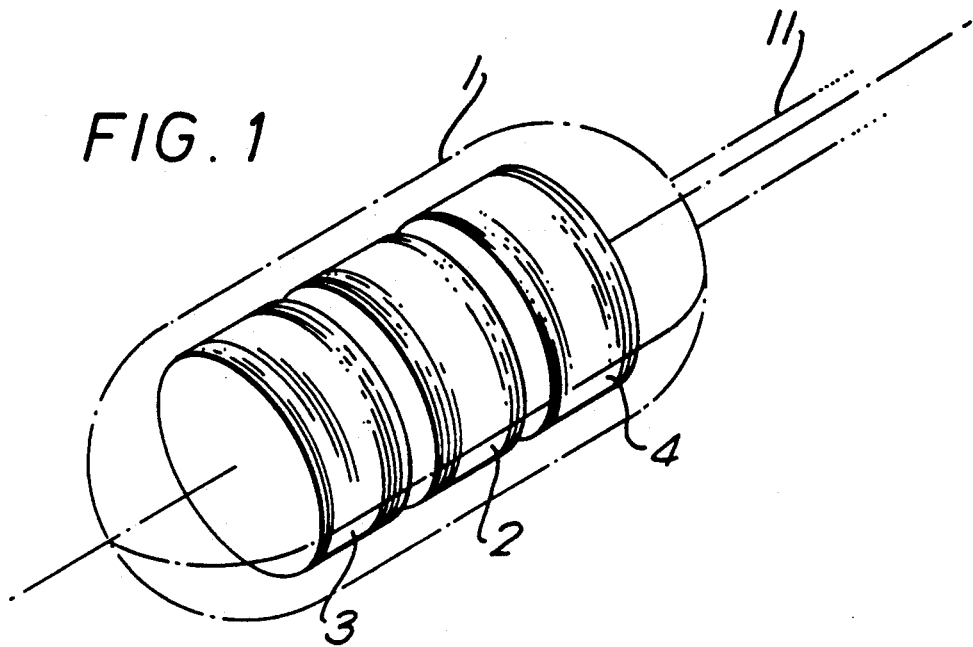
FIG. 1 is a diagrammatic perspective view of the sonde of a first embodiment of a detector of the invention.
Figure 2:
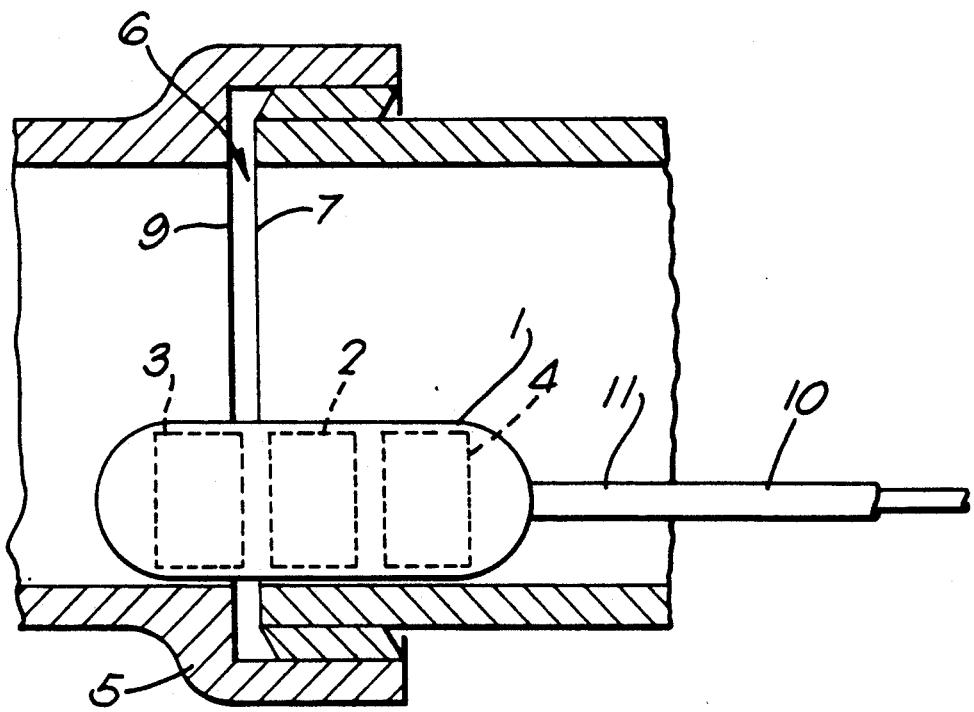
FIG. 2 is a cross-sectional side view of a pipe joint with the coils in a sonde at the joint.
Figure 3:
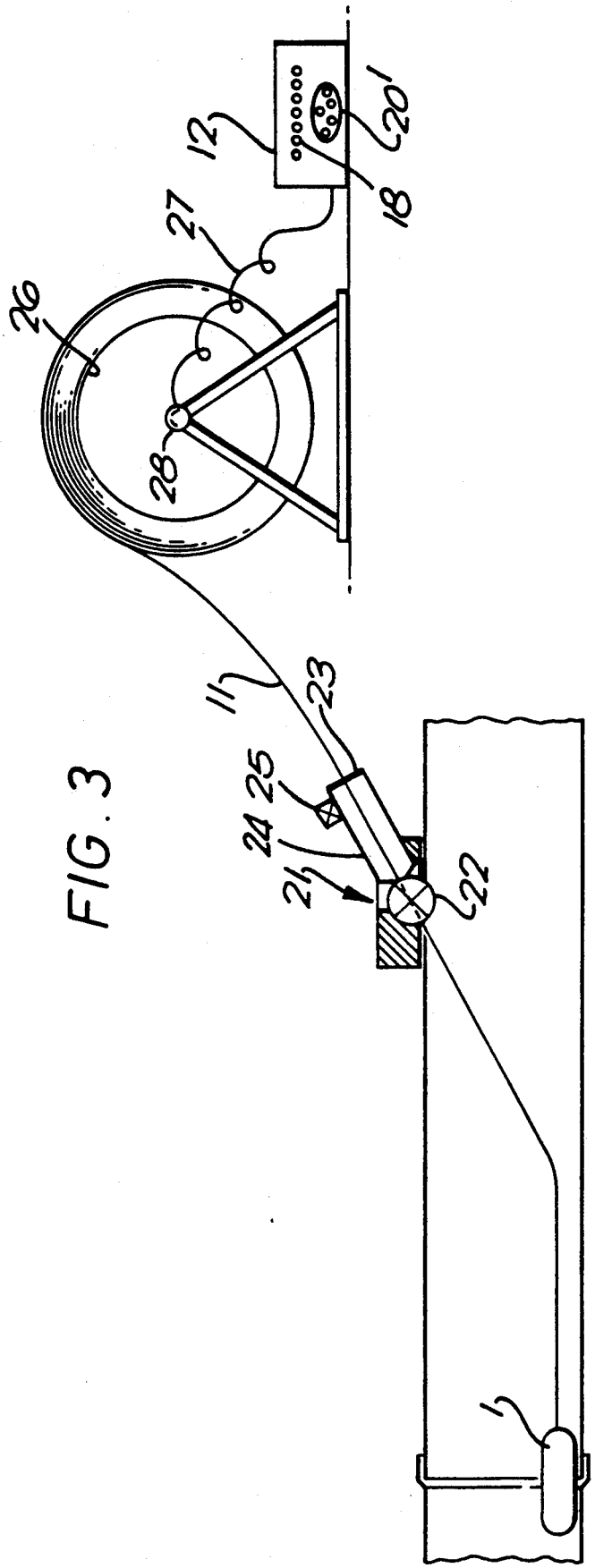
FIG. 3 is a diagrammatic side view of the detector.
Figure 4:
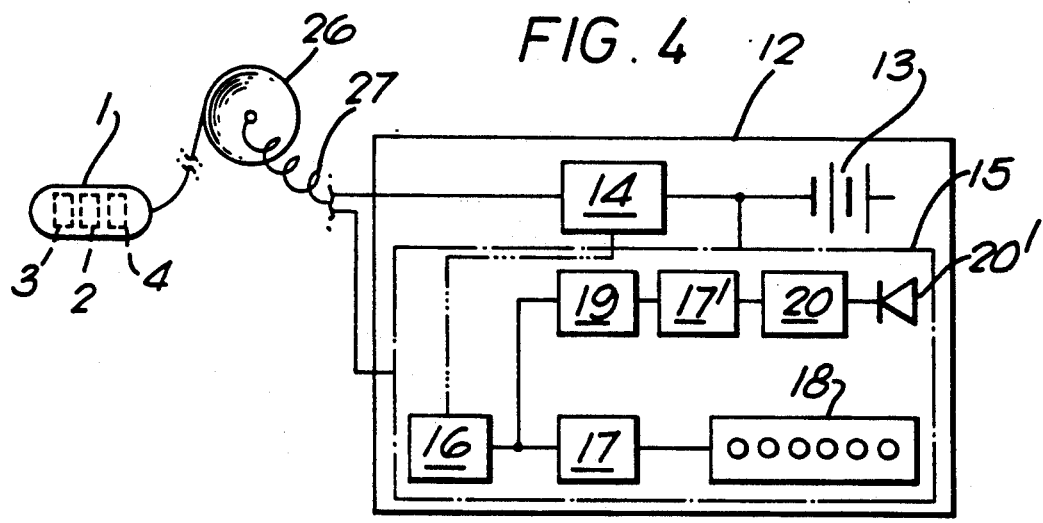
FIG. 4 is a block diagram of electronic circuitry of the detector.
Figure 5:
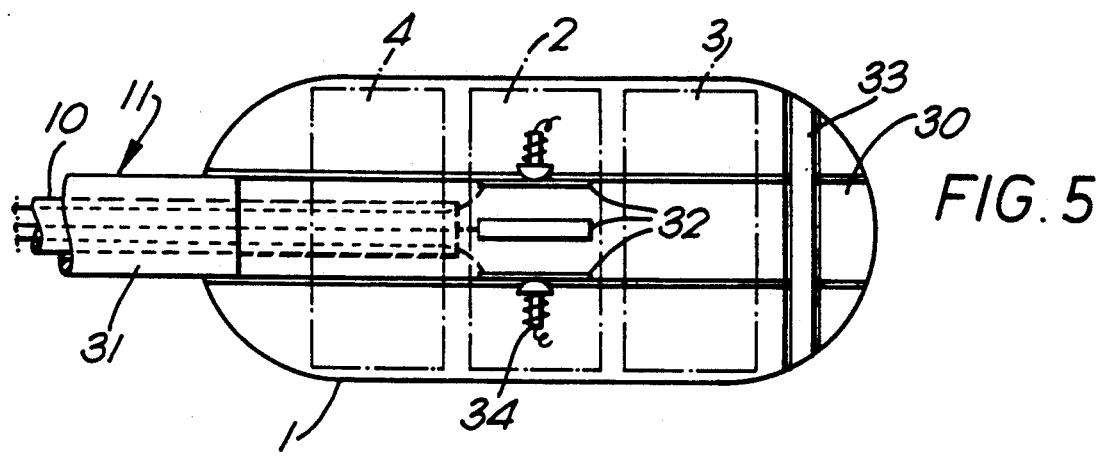
FIG. 5 is a cross-sectional view of the sonde.

Referring to FIGS. 1 to 5 of the drawings, the detector has a sonde 1 comprising a Tufnol former which is circular cylindrical with hemi-spherical ends. The former carries three coils 2,3,4 wrapped in protective glass reinforced plastics material. The sonde is typically 38 mm in diameter and 100 mm long. Its coils are all similar comprising 53 turns spreading 20 mm axially and having a diameter of 33 mm. With the transmitting coil 2 axially in the centre of the sonde, the receiving coils 3,4 are spaced axially at 200 mm centre distances on either side of the transmitting coil. All the coils are co-axial. This configuration has been found to be suitable for detecting joints 5 in 150 mm internal diameter cast iron pipes. Internally the joint presents an annular space 6 of larger than 150 mm diameter where the end 7 of one pipe received in the socket 8 of another pipe does not make perfect electrical contact with the root of the socket. When as shown in FIG. 2, the sonde lies at a joint with one receiving coil 3 at the joint space 6, the respective magnetic coupling between the two receiving coils and the pipe is unequal.

The coils 2,3,4 are connected via a cable 10 inside a rod 11 to drive and detection circuitry within a control box 12. The circuitry is powered from a battery 13 of low voltage cells. A drive unit 14 applies a square current pulse of approximately 0.5 amperes for 50 μsec to the transmitting coil 2 every 1 msec—that is at a frequency of 1 kHz with a mark space ratio of 20 to 1. The pulse induces magnetic field in the pipe at the sonde 1. When the pulse terminates, the magnetic field is retained in the metal by eddy currents. The magnetic field from these eddy currents as they decay induces voltages in the receiving coils 3,4. Where the coupling from the metal to both receiving coils is identical, the voltage induced in both is identical. By wiring the coils 3,4 in series opposition no signal will normally be received at a detection unit 15. If however the sonde 1 is at a joint, the detection unit will receive a signal in accordance with the inbalance of induced voltage.

The detection unit 15 includes a sampling voltmeter 16, enabled approximately 10 μsec after each pulse of drive current, and a modulous unit 17 whose output is indicative of the difference in magnitude of the voltages induced in the coils 3,4. This output is applied for display to a voltmeter 18 in the form of a linear array of LEDs. The signal from the sampling voltmeter 16 is also applied to a high pass filter 19 and thence to a second modulous unit 17' and a threshold unit 20. When the voltage differences in the two receiving coils exceeds a determined threshold, an alarm 20' is sounded.

The sonde 1 and rod 11 are introduced into the pipe via a clamp-on fitting 21 having a valve 22 and a seal 23. The seal 23 is initially assembled around the rod 11 with the sonde in a chamber 24 between the valve 22 and the seal 23.

For assembly of the rod 11 through the seal 23, the sonde 1 is removable. The rod 11 has a Tufnol extension 30 bounded over the end of the glass fibre rod and having the outer diameter of a protective sheath 31 extending along the rod 11. Four axially oriented, circumferentially spaced contact pads 32 are set in the extension 30 and are connected to the cable 10. This extension 30 extends into the centre of the sonde 1 and is secured thereto by a cross-pin 33 engaging in the forward hemi-spherical end of the sonde. The sonde has four spring biased contacts 34 which engage the pads 32. One pair of contacts is for the transmitting coil 2 and the other is for the receiving coils 3,4 wired in series opposition.

When the seal 23 is tight, air is vented from the chamber 24 via a bleed 25 and the valve 22 is opened. The rod 11 is extended fully into the pipeline pushing the sonde past a number of joints. In this operation, the rod, which has limited flexibility being of glass reinforced plastics material, is unwound from a coil former 26. The cable 10 has a free length 27 extending from the hub 28 of the former to the control box 12. This free length is sufficient—typically 1 meter—to accommodate limited twisting as the few turns of the rod 11 are unwound.

Once the rod is fully extended, it is withdrawn back towards the fitting 21. Every time the sonde passes a joint the audio alarm 20' is sounded. The exact location of the joint is found by moving the sonde back until the voltmeter displays a maximum reading. The position of the joint can be recorded by marking the rod at the seal 23. On withdrawal of the sonde, laying of the rod out on the ground over the pipe with the sonde at the entry point places the marks on the rod directly above the joints which they mark.

SECOND EMBODIMENT

In the alternative embodiment of sonde shown in FIGS. 6 and 7, the sonde 101 is permanently connected to its rod 102. The sonde comprises a generally circular cylindrical former 103 having three coils 104,105,106 set in corresponding grooves 107 in the circumferential surface of the former. The coils are protected by a glass reinforced plastic material wrapping 108. Connecting wires from the coils pass via drillings 109 to a bore 110 into one end of the former, for connection here with cable wires 111 within the rod 102. The rod 102 is a glass reinforced plastics rod having a central space occupied by the wires 111. The end of the rod is secured in the bore 110 by a pin 112 which passes through an end spigot 113 of the former and the edge of the rod— thereby securing it whilst missing the wires 111. Also secured in the end spigot 113 is a tubular connector 114 for a pipe 115 for supplying sealing compound. The pipe 115 and the rod 102 are both contained within an outer protective sheath 116 push-fitted onto the end spigot 112.

The tubular connector 114 is in communication with a bore 115' within the former to a central void 117, around which the coil 104 extends. The coils are separated by spacing rims 118,119. Small diameter nozzle drillings 120—typically 0.8 mm in diameter—extend from the void 117 through the rims, whereby pressurized sealing compound from the pipe 115 can be sprayed via the drillings when for instance a joint in pipework is detected with the sonde. The void 117 is closed by an end cap 121 screwed into the end of the former opposite from its spigot 113.

At their ends remote from the sonde 101, the cable wires are connected to control circuitry similar to that of the first embodiment and the pipe 115 is connected to means for applying pressurized sealing compound into the pipe 115.

In use, the sonde is moved along inside a gas main to be sealed until a joint is detected and the circuitry alarms. The sonde is then positioned exactly on the joint in correspondence with a maximum voltmeter reading. The pressurized sealing compound is then applied down the pipe 115 and emerges as a jet from the nozzle drillings 120.

THIRD EMBODIMENT

In a third embodiment of sonde 201, shown in FIG. 8, the former has a plain circumference, to which the coil windings 202,203,204, in pre-wound form are applied. They are separated by spacing rings 205 and held in place by a glass reinforced plastics material wrapping 206. Wires from the winding extend in a surface groove 207 to the forward end of a spigot 208 into which they are led adjacent a bore 209 accommodating a rod 210 for connection to its wires. The former has a sealing compound void 211 and drillings 212 from this void through the coil spacing rings 205 for sealing compound spraying.

FOURTH EMBODIMENT

Figure 9:
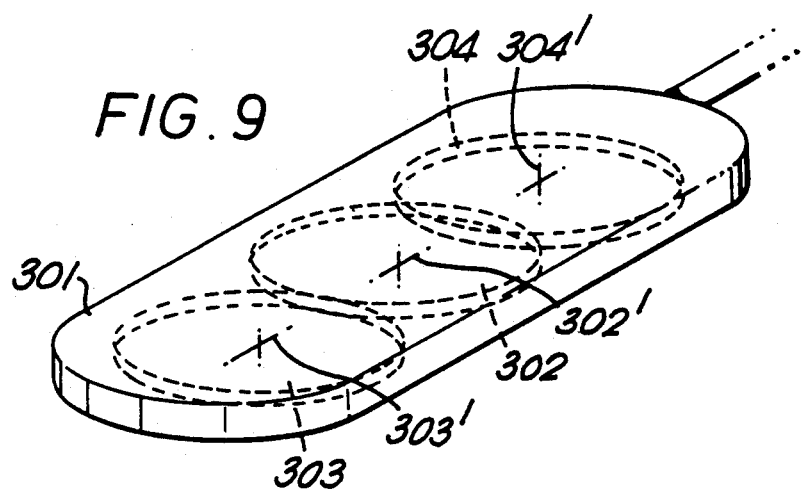
FIG. 9 is a perspective view of a sonde of a fourth embodiment.

A fourth embodiment of sonde 301 is generally planar, as shown in FIG. 9. It, like the first embodiment, has no sealing compound spray arrangements. Its coils 302,303,304 are generally co-planar and slightly overlap. Their central axes 302',303',304' are axially spaced in the sonde.

The invention is not intended to be restricted to the details of the above embodiments. In an alternative method of joint marking, the control box can be switched to apply by non-shown circuitry a very low frequency, e.g. 30 Hz, electric current to the transmitting coil to produce an electromagnetic field that will pass through the wall of the pipe and the earth in which the pipe is buried. Its location can be found by use of a search coil carried along the expected line of the pipe to the point of maximum response. Once this is noted; other joints can be similarly located.

Having thus described the invention, what is claimed is:

1. Apparatus for detecting a discontinuity in a pipe and for supplying a sealant to seal the discontinuity so detected, the apparatus comprising means for generating an electrical drive current, a sonde having a body with transmitting coil means to be subjected to the drive current and adapted to induce a magnetic field in two adjacent portions of the pipeline and receiving coil means adapted to have induced therein voltages from the portions and to provide a signal when the magnetic field in one portion of the pipeline differs from that in the other portion of the pipeline due to the fact that the discontinuity lies in the vicinity of one or other of the portions and means for detecting the signal, the sonde body having a surface at which there terminates a plurality of sealing compound jetting nozzle drillings extending through and circumferentially around the body, the plurality of nozzle drillings being connected to a sealing compound supply pipe whereby on detecting the discontinuity the compound can be supplied to the plurality of nozzle drillings to seal the discontinuity.

2. Apparatus as claimed in claim 1, wherein the sonde includes a connection for adapting to the supply pipe.

3. Apparatus as claimed in claim 2, wherein the sonde includes a plurality of the at least one sealing compound jetting nozzle drillings.

4. Apparatus as claimed in claim 1, the sonde body includes a central chamber forming a reservoir for a sealing compound, and the at least one nozzle drillings extending from the chamber which is connected to the sealing compound supply pipe when the compound is sprayed.

5. Apparatus as claimed in claim 3, the sonde body includes a central chamber forming a reservoir for a sealing compound, and the at least one nozzle drillings extending from the chamber which is connected to the sealing compound supply pipe when the compound is sprayed.

6. Apparatus as claimed in claim 5, in which the sonde has a removable end for cleaning of the central chamber.

7. Apparatus as claimed in claim 1, in which the receiving coil means comprises a pair of receiving coils in which are induced different voltages if the magnetic coupling from one portion of the pipeline to one coil differs from the magnetic coupling from the other portion of the pipeline to the other coil due to the discontinuity lying in one or other of the portions and means for comparing the voltages so induced in the respective coils to provide the signal.

8. Apparatus as claimed in claim 7, in which the receiving coils are spacedly arranged on respective opposite sides of the transmitting coil.

9. Apparatus as claimed in claim 8, in which the coils are arranged parallel with each other, their axes being substantially co-axial.

10. Apparatus as claimed in claim 8, in which the sonde is machined with circumferential grooves for the coils, between which, coils are spaced by rim members, the coils being wound onto the sonde.

11. Apparatus as claimed in claim 8, in which the sonde has a plain circumference and the coils are pre-wound and assembled onto the sonde with coil spacing members.

12. Apparatus as claimed in claim 8, in which the coils are arranged parallel with each other, their axes being spaced along the sonde.

13. Apparatus as claimed in claim 8, in which the drive current generating means is adapted to generate a series of switched DC pulses and the induced voltage comparing means is adapted to compare the said voltages subsequent to each pulse.

14. Apparatus as claimed n claim 13, in which the current generating means and the voltage comparing means are provided as a single unit with the sonde.

15. Apparatus as claimed in claim 8, including a remote control unit having the current generating means and the voltage comparing means, and a cable connected between the sonde and the remote control unit, whereby the sonde is movable along the pipeline independently of the control unit.

16. Apparatus as claimed in claim 15, including a flexible rod attached to the sonde and guiding the cable along the length of the rod for movement of the sonde by manipulation of the remote end of the rod.

17. Apparatus as claimed in claim 16, in which the cable is accommodated within the flexible rod.

18. Apparatus as claimed in claim 16, in which there is provided a coiling device on which the flexible rod can be coiled and the cable has a portion extending from a hub of the coiling device to the control unit, which portion is of such a length as to be able to tolerate a limited number of twists corresponding to uncoiling of the full length of the flexible rod.

19. Apparatus as claimed in claim 16, in which the sonde is permanently attached to the flexible rod and the three coils are permanently connected to the cable.

20. Apparatus as claimed in claim 16, in which the sonde is detachable from the flexible rod and the three coils are disconnectible from the cable.

21. Apparatus as claimed in claim 17, in which the sonde has an end spigot at which the flexible rod and the supply pipe are permanently attached and onto which is attached a protection tube, in which the flexible rod and the supply pipe extend.

22. Apparatus as claimed in claim 1, in which the sonde is generally circularly cylindrical with hemispherical ends, with a length appreciably greater than its diameter.

23. Apparatus as claimed in claim 5, in which the receiving coils are connected in series opposition and the induced voltage comparing means includes voltage measuring means.

24. Apparatus as claimed in claim 23, in which the voltage measuring means is a sampling voltmeter and the induced voltage comparing means includes enabling means for enabling the sampling voltmeter a short period after each of the DC pulses, a modulus unit arranged to output the modulus of the output of the sampling voltmeter, and a display voltmeter for displaying the output of the modulus unit as the modulus of the difference in voltage induced in the two, spaced receiving coils.

25. Apparatus as claimed in claim 24, in which the induced voltage comparing means includes a high pass filter connected to the sampling voltmeter, a second modulus unit connected to the high pass filter, a threshold unit connected to the second modulus unit and an alarm connected to the threshold unit, the arrangement being such that the alarm is triggered if the difference in voltage induced in the two, spaced receiving coils exceeds a predetermined threshold, indicative of a discontinuity in the medium being researched.

26. Apparatus for detecting a discontinuity in a pipe and for supplying a sealant to seal the discontinuity so detected, the apparatus comprising means for generating an electrical drive current, a sonde having transmitting coil means to receive to the drive current and adapted to induce a magnetic field in two adjacent portions of the pipeline, and receiving coil means adapted to have induced therein voltages from the adjacent portions and to provide a signal when the magnetic field in one portion of the pipeline differs from that in the other portion of the pipeline due to a discontinuity in the vicinity of one or other of the portions, and means for detecting the signal; the sonde also has at least one sealing compound jetting nozzle drillings for connection to a sealing compound supply pipe so that upon detecting the discontinuity the compound can be supplied to the at least one nozzle drillings to seal the discontinuity;

wherein the receiving coil means includes a pair of receiving coils in which different voltages are induced if the magnetic coupling from one portion of the pipeline to one coil differs from the magnetic coupling from the other portion of the pipeline to the other coil due to the discontinuity lying in one or other of the portions; and means for comparing the voltages so induced in the respective coils to provide the signal;

wherein the receiving coils are spacedly arranged on respective opposite sides of the transmitting coil;

wherein a remote control unit having the current generating means and the voltage comparing means, and a cable connected between the sonde and the remote control unit, whereby the sonde is movable along the pipeline independently of the control unit;

wherein a flexible rod is attached to the sonde for guiding the cable along the length of the rod for movement of the sonde by manipulation of the remote end of the rod;

wherein the sonde is detachable from the flexible rod and the three coils are disconnectable from the cable;

wherein the sonde has a longitudinal bore for accommodating the end of the rod, the sonde and the flexible rod each have a cross bore for accommodating a cross pin to attach the sonde to the flexible rod at determined longitudinal axial orientation, the sonde has contacts connected to the coils, arranged on its longitudinal bore and spring biased inwardly thereof and the end of the rod has contacts connected to the cable and arranged to be contacted by the sonde contacts when the sonde is attached to the rod.

* * * * *